Jan. 23, 1923. 1,443,242.
F. P. ROTH.
TOASTING MACHINE.
FILED FEB. 4, 1919.
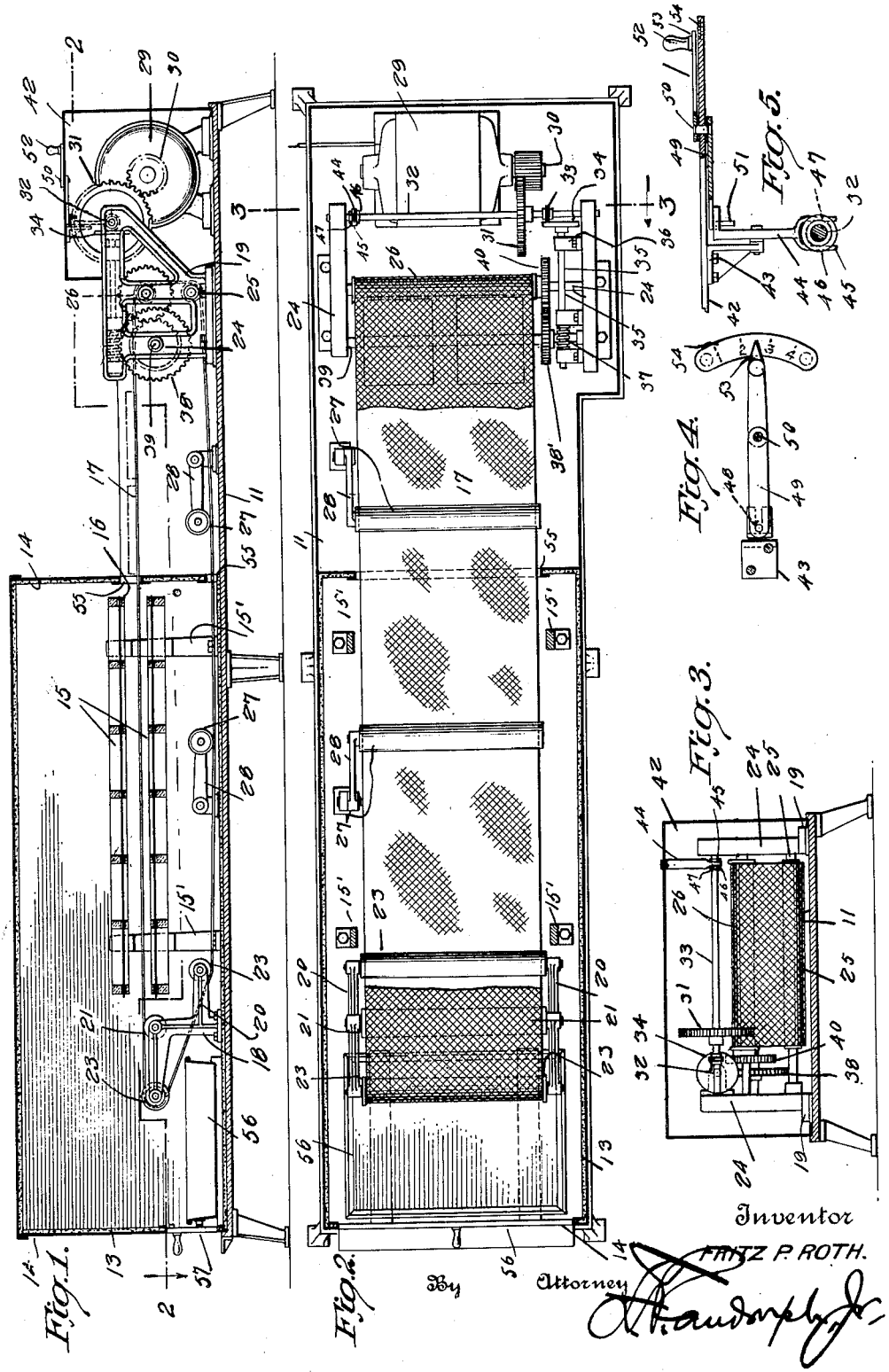
Inventor
FRITZ P. ROTH.
By Attorney Patented Jan. 23, 1923.

1,443,242

UNITED STATES PATENT OFFICE.

FRITZ PAUL ROTH, OF NEW YORK, N. Y.

TOASTING MACHINE.

Application filed February 4, 1919. Serial No. 274,929.

*To all whom it may concern:*

Be it known that I, FRITZ P. ROTH, a citizen of the United States, residing at New York city, in the county of New York and State of New York, have invented certain new and useful Improvements in Toasting Machines; and I do hereby declare the following to be a full, clear, and exact description of the invention, such as will enable others skilled in the art to which it appertains to make and use the same.

My invention relates to improvements in electrical cooking apparatus and more particularly to a device for toasting bread.

An important object of this invention is to provide a bread toaster adapted for conveying toast at a uniform rate of speed between two heating elements, whereby the toast is uniformly subjected to the heat.

A further object of the invention is to provide a device of the character described having novel means for regulating the speed and controlling the toast conveying elements, whereby the period during which toast is subjected to the heat may be lengthened or shortened as may be desired.

A further object of the invention is to provide a device of the character described, which is efficient, reliable and durable in construction, and cheap to manufacture.

A further object of the invention is to provide a toasting apparatus of the character described which requires a minimum degree of heat.

Other objects and advantages of the invention will be apparent during the course of the following description.

In the accompanying drawing forming a part of this specification, and in which like numerals are employed to designate like parts throughout the same, Figure 1 is a longitudinal vertical section through a toasting apparatus embodied in my invention, Figure 2 is a horizontal section taken on line 2—2 of Figure 1, Figure 3 is a vertical transverse section taken on line 3—3 of Figure 2, Figure 4 is a fragmentary plan view of a speed regulating device embodied in the invention, and, Figure 5 is a detail section through the device showing the speed regulating means in elevation.

The toaster comprises a body having a flat base 11 mounted upon legs as usual. As illustrated in Figure 1, a sheet metal casing 13 is arranged on the base 11 and is preferably of a rectangular formation. The casing 13 is provided with a lining of asbestos 14 or other non-heat conducting element. A pair of heating elements 15 are horizontally arranged within the casing 13 and are disposed in spaced relation. The heating elements 15 may be of the electric type and have connection with the electric wires 16. A conveyor 17 is adapted to convey toast or other food to be cooked between the heating elements 15 at a relatively slow and uniform rate of speed. The conveyor 17 may be of a wire mesh if desired, and is mounted on brackets 18 and 19. The bracket 18 consists of a pair of standards 20 carrying rotatable rollers 21, 22 and 23. As illustrated in Figure 1, the bracket 19 comprises a pair of standards 24 arranged exteriorly of the casing 13 and at one end of the base 11. Horizontally disposed rollers 25 and 26 are carried by the standards 24 and support one end of the conveyor. A pair of idlers 27 are mounted on the inner side of the lower portion of the conveyor and are adapted to retain the upper side of the conveyor taut for insuring the uniform spacing of the bread between the heating elements 15. The idlers are carried by pivoted arms 28.

As more clearly illustrated in Figure 2, an electric motor 29 is mounted on the base 11 and revolves at the rate of about 1500 revolutions per minute. A pinion 30 is keyed to the shaft of the motor 29 and in this case is provided with twenty-five teeth and meshes with a gear 31 mounted on a cross shaft 32. The cross shaft 32 is rotatably carried by the standards 24. The gear 31 is provided with fifty teeth, thereby reducing the speed of the shaft 32 to 750 revolutions per minute. A friction roller or gear 33 is keyed on the shaft 32 and contacts with a friction disk 34. The friction disk 34 is mounted on a longitudinally extending shaft 35 carried by bearing members 36 mounted on one of the standards 24. When in its intermediate position with relation to the disk 34, the friction roller 33 rotates the shaft 35 at about 250 revolutions per minute. A worm 37 is keyed on one end of the shaft 35 and meshes with a gear 38. The gear 38 is mounted on a cross shaft 39 carried by the standards 24. By reason of the ratio between the worm 37 and the gear 38, the shaft 39 rotates at about two and one-half revolutions per minute. A gear 40 mounted on the drive roller shaft 26 meshes with the gear 38 and serves to rotate the drive roller at about two revolutions per minute. The drive roller 26 is in this instance one inch in diameter and since it revolves about two revolutions per minute, the conveyor travels six inches per minute.

While I have shown and described a particular gearing it is to be understood that any desired gearing may be employed.

For the purpose of regulating the speed at which the conveyor travels, I have provided means for adjusting the friction roller 33 at various positions on the friction disk 34. The speed regulating mechanism is mounted on a casing 42 arranged on the base 11 and extending over the operating mechanism. A bracket 43 is secured to the casing 42 and has pivotal connection with an arm 44 intermediate its ends thereof. The lower portion of the arm 44 is provided with forks 45 engaging a collar 46 keyed or otherwise secured to the shaft 32. The collar 46 is provided with an annular groove 47 receiving the forks or fingers 45. The upper end portion of the arm 44 is bent at right angles and is provided with a slot 48 extending longitudinally thereof. An operating lever 49 pivotally connected to the casing 42 as at 50 is provided with a pin 51 operating within the slot 48. A handle 52 is secured to the forward end of the lever 49 and is adapted for operating the arm 44. The lever 49 is provided with a pointer finger 53 extending over a dial 54 for indicating the speed at which the conveyor is traveling. The dial indicates the speed of the conveyor in terms of inches per minute.

With reference to Figure 5, it will be apparent that the movement of the pointer finger along the dial 54, will cause the arm 44 to move the collar 46 and shaft 32 longitudinally thereby varying the ratio between the friction roller 33 and the friction disk 34. The casing 13 is provided with openings 55 for receiving the conveyor belt 17. A pan or tray 56 is adapted to receive the toast upon its discharge from the conveyor. A door 57 is arranged in one side of the casing and is adapted to permit access to the pan 56.

While I have shown and described the preferred embodiment of my invention, it is understood that I may make such minor changes in arrangement and construction of parts, as will remain within the spirit of the invention and scope of the appended claim.

Having thus described my invention, what I claim is:—

A toasting machine having a casing, a base supporting said casing and extending beyond one end thereof, heating means within the casing, a single endless conveyor operable to move material from outside the casing and between the heating means for toasting, means on said base exteriorly of the casing to drive said conveyor, the discharge end of said conveyor being located within the casing, a collecting receptacle within the casing cooperating with said discharge end, and means of access through the casing to said receptacle.

In testimony whereof I affix my signature in presence of two witnesses.

FRITZ PAUL ROTH.

Witnesses:
FREDERICK B. ALBLY,
JOSEPH H. BUESHORE.